# (12) United States Patent
Clingerman et al.

(10) Patent No.: US 7,344,788 B2
(45) Date of Patent: Mar. 18, 2008

(54) STARTING A FUEL CELL SYSTEM USING AMBIENT AIR AND A LOW VOLTAGE BLOWER

(75) Inventors: Bruce J Clingerman, Palmyra, NY (US); Scott B Dewey, Dansville, NY (US); Rainer Pechtold, Rüsselsheim (DE); Roland Nolte, Dexheim (DE); Hermann Victor, Mainz-Mombach (DE); Bernhard Wnendt, Rüsselsheim (DE); Christian Kunstmann, Bad Soden (DE); Manfred Herrmann, Ginsheim (DE)

(73) Assignee: General Motors Corporation, Detroit, MI (US)

( * ) Notice: Subject to any disclaimer, the term of this patent is extended or adjusted under 35 U.S.C. 154(b) by 336 days.

(21) Appl. No.: 10/782,520

(22) Filed: Feb. 19, 2004

(65) Prior Publication Data

US 2005/0186454 A1 Aug. 25, 2005

(51) Int. Cl.
*H01M 8/04* (2006.01)
(52) U.S. Cl. .............................. 429/13; 429/17; 429/19; 429/21; 429/23
(58) Field of Classification Search .................. 429/13, 429/22
See application file for complete search history.

(56) References Cited

U.S. PATENT DOCUMENTS

| | | | |
|---|---|---|---|
| 5,272,017 A | 12/1993 | Swathirajan et al. | |
| 5,314,762 A * | 5/1994 | Hamada et al. | 429/37 |
| 5,316,871 A | 5/1994 | Swathirajan et al. | |
| 5,670,266 A * | 9/1997 | Thomas et al. | 429/3 |
| 5,763,113 A | 6/1998 | Meltser et al. | |
| 6,068,941 A * | 5/2000 | Fuller et al. | 429/13 |
| 6,218,038 B1 | 4/2001 | Oko et al. | |
| 6,612,385 B1 * | 9/2003 | Stuhler et al. | 180/65.3 |
| 2002/0064695 A1 * | 5/2002 | Raiser | 429/13 |
| 2004/0126632 A1 * | 7/2004 | Pearson et al. | 429/17 |
| 2004/0131898 A1 * | 7/2004 | Zhang et al. | 429/12 |
| 2005/0106424 A1 * | 5/2005 | Elhamid et al. | 429/9 |
| 2005/0158601 A1 * | 7/2005 | Skala | 429/31 |

FOREIGN PATENT DOCUMENTS

| | | |
|---|---|---|
| DE | 10130095 A1 | 3/2002 |
| DE | 10047138 A1 | 4/2002 |

* cited by examiner

*Primary Examiner*—Jonathan Crepeau
*Assistant Examiner*—Tony Chuo

(57) ABSTRACT

A mechanization of a fuel cell system and a method of operating the same is provided which simplifies the start-up of the fuel cell system. The fuel cell system can be started up without using any battery derived high voltage power to drive a high voltage compressor. The present invention provides for the use of a low voltage blower to provide oxygen to the cathode side of the fuel cell stack to enable start-up of the fuel cell stack without the initial use of a high voltage compressor. The low voltage blower can be powered by a low voltage power source and/or the voltage produced by the fuel cell stack.

46 Claims, 1 Drawing Sheet

STARTING A FUEL CELL SYSTEM USING AMBIENT AIR AND A LOW VOLTAGE BLOWER

FIELD OF THE INVENTION

The present invention relates to a fuel cell system, and more particularly, to methods of start-up of a fuel cell stack using ambient air and a low voltage blower.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell, and oxygen is supplied to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which serve as current collectors for the anode and cathode, and contain appropriate channels and/or openings therein for distributing the fuel cells gaseous reactants over the surfaces of the respective anode and cathode catalyst. A typical PEM fuel cell and its membrane electrode assembly (MEA) are described in U.S. Pat. Nos. 5,272,017 and 5,316,871 issued respectively Dec. 21, 1993 and May 31, 1994 and assigned to General Motors Corporation.

The term "fuel cell" is typically used to refer to either a single cell or a plurality of cells depending on the context. A plurality of individual cells are commonly bundled together to form a fuel cell stack. Each cell within the stack comprises the MEA described earlier, and each such MEA provides its increment of voltage. Typical arrangements of multiple cells in a stack are described in U.S. Pat. No. 5,763,113 assigned to General Motors Corporation, and which is herein incorporated by reference.

During fuel cell system start-up, a compressor is often utilized to provide compressed air or oxygen to the fuel cell cathode inlet while hydrogen is introduced to the fuel cell anode inlet. Many fuel cell systems currently use large battery packs to start and operate the compressor before output power is available from the fuel cell stack. The large battery pack often is utilized with various DC/DC converters to provide the high voltage necessary for the compressor. Usually, one or more DC/DC converters are needed to get the battery voltage up to the stack level, then another DC/DC converter is needed to get the voltage from the stack level up to the compressor motor level. The large battery pack and DC/DC converters contribute significantly to the weight, volume, and cost of the fuel cell system. Thus, it is desirable to provide a simplification of the fuel cell system as well as reducing the mass, volume and cost of the system.

SUMMARY OF THE INVENTION

Accordingly, the present invention is provided to simplify the starting of a fuel cell system without using any battery-derived high voltage power to drive the compressor. Rather, the present invention provides for the use of a low voltage blower to provide oxygen to the cathode side of the fuel cell stack to enable start-up of the fuel cell stack without the initial use of the high voltage compressor. The low voltage blower can be powered by a low voltage power source and/or the voltage produced by the fuel cell stack.

A fuel cell system according to the principles of the present invention includes a fuel cell stack having an anode side with an anode inlet and a cathode side with a cathode inlet. The fuel cell stack is operable to convert a hydrogen-containing reactant on the anode side and an oxygen-containing reactant on the cathode side into electricity, an anode effluent and a cathode effluent. A hydrogen-containing reactant source is connected to the anode inlet and an oxygen-containing reactant source is connected to the cathode inlet. A low voltage blower operable to supply oxygen-containing reactant from the oxygen-containing reactant source is connected to the cathode inlet. A high voltage compressor operable to supply oxygen-containing reactant from the oxygen-containing reactant source is connected to the cathode inlet.

In one aspect of the present invention, a method of fuel cell start-up for a fuel cell system includes: (1) introducing hydrogen to the anode inlet of the fuel cell stack; (2) operating a blower with a low voltage power source for supplying oxygen to the cathode inlet of the fuel cell stack; and (3) producing a voltage output with the fuel cell stack.

In another aspect of the present invention, the cathode side of the fuel cell stack contains oxygen prior to start-up and the low voltage blower is powered by the fuel cell stack. The presence of oxygen in the cathode side can be the result of a variety of operational factors, such as a purging operation of the fuel cell stack, operation with a high lambda of oxygen just prior to shutting down the fuel cell stack, and preloading the cathode side with oxygen. In this aspect, the method includes: (1) introducing hydrogen to the anode inlet of the fuel cell stack for producing a voltage with the fuel cell stack; (2) operating the low voltage blower with the voltage of the fuel cell stack for supplying additional oxygen to the cathode inlet of the fuel cell stack via the blower; and (3) increasing the voltage produced by the fuel cell stack over time.

In a different aspect of the present invention, the fuel cell stack is operated to maintain a minimum voltage output that can be used to start-up the fuel cell stack when normal operation is required. In this method, when normal operation of the fuel cell stack is not needed, the fuel cell stack is operated in a stand-by mode. When in the stand-by mode, the voltage of the fuel cell stack is monitored and maintained above a predetermined minimum value. To maintain the voltage above the predetermined minimum value, hydrogen is selectively introduced into the anode inlet of the fuel cell stack and a low voltage blower is selectively operated with the voltage of the fuel cell stack to supply oxygen to the cathode inlet of the fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
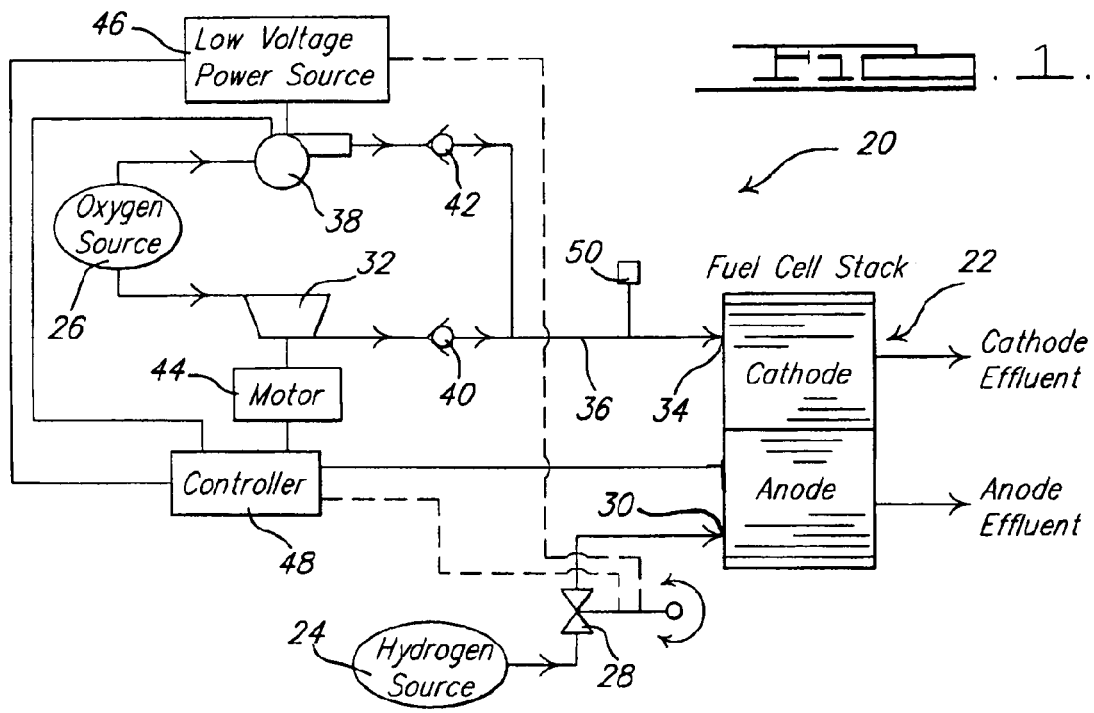
FIG. 1 is a schematic view of a preferred embodiment of a fuel cell system capable of providing fuel cell start-up without using any battery-derived high voltage power to drive the compressor according to the principles of the present invention.

The following description of the preferred embodiment is merely exemplary in nature and is in no way intended to limit the invention, its application, or uses.

The present invention is directed to a fuel cell system 20, in particular a fuel cell system whereby start-up of a fuel cell stack can be performed without using any battery-derived high voltage power to drive the compressor. In the preferred embodiment, fuel cell system 20 includes a fuel cell stack 22 which is connected to a hydrogen source 24 and an oxygen source 26, as are well known in the art. In overview, a fuel cell stack 22 includes a plurality of membrane electrode assemblies (MEAs) each disposed between a plurality of bipolar plates. As is known in the art, the stack may also include a plurality of gas distribution layers, a plurality of anode manifolds, a plurality of cathode manifolds, a plurality of coolant manifolds and end plates, all arranged in a stacked relation. The sequence of MEAs and bipolar plates is repeated to provide the desired voltage output for fuel cell stack 22. As is known in the art, each MEA includes a membrane in the form of a thin proton transmissive non-electrically conductive solid polymer electrolyte. An anode catalyst layer is provided on one surface of the membranes and a cathode catalyst layer is provided on the opposite surface of the membranes. For purposes of the present invention, the configuration of fuel cell stack 22 can be of any known arrangement.

The hydrogen source 24 can include a fuel processor or stored hydrogen, as is known in the art. A hydrogen supply valve 28 (either manual and/or electronic solenoid controlled) is provided in communication with hydrogen source 24 for providing hydrogen to an anode inlet 30 of fuel cell stack 22. Hydrogen supply valve 28 can be manually operated and/or operated by an electronic solenoid. Hydrogen supply valve 28 can be initially manually operated via a push button or some other type of linkage arrangement and later electrically operated via the solenoid when sufficient power is available or being generated by fuel cell system 20. If desired, a mechanical timer (not shown) or similar device can be used to maintain the open condition of hydrogen supply valve 28 until it can be electrically controlled to avoid the necessity of manually maintaining the open condition of hydrogen supply valve 28 during start-up.

Figure 2:
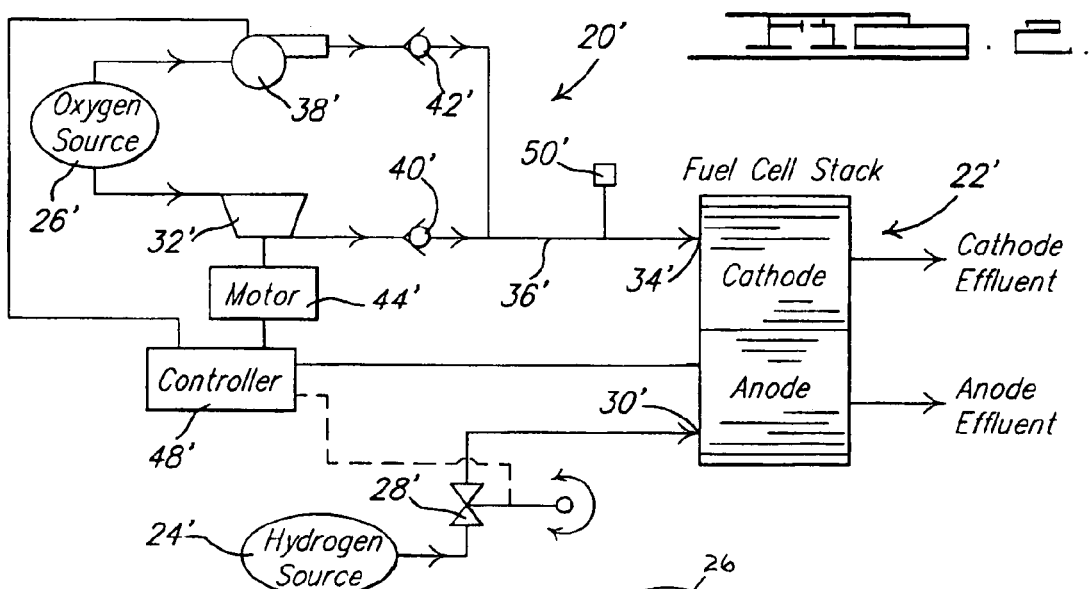
FIG. 2 is a schematic view of an alternate embodiment of a fuel cell system capable of providing fuel cell start-up without using any battery-derived high voltage power to drive the compressor according to the principles of the present invention.
Figure 3:
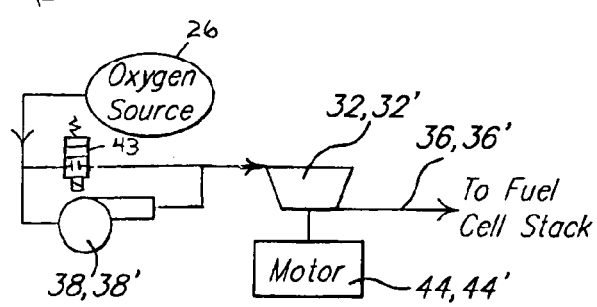
FIG. 3 is a schematic view of an alternate arrangement of the low voltage blower and high voltage compressor according to the principles of the present invention.

Oxygen in the form of air or pure oxygen is supplied to fuel cell system 20 by an oxygen source 26 which is in communication with a high voltage compressor 32 which delivers oxygen to cathode inlet 34 of fuel cell stack 20 via a cathode gas passage 36. Oxygen source 26 is also in communication with a low voltage blower 38 which delivers oxygen to cathode inlet 34 of fuel cell stack 20 via cathode gas passage 36. Thus, oxygen can be supplied to the cathode side of fuel cell stack 22 via cathode inlet 34 from either compressor 32 and/or blower 38 through cathode gas passage 36. A pair of check valves 40, 42 are positioned between cathode gas passage 36 and the respective compressor 32 and blower 38. Check valves 40, 42 prevent the backflow of oxygen into compressor 32 or blower 38 when oxygen is being supplied by the respective blower 38 and compressor 32. In an alternate arrangement, as shown in FIG. 3, blower 38 and compressor 32 are positioned in-line with one another. In this embodiment, compressor 32 allows a direct flow through of oxygen provided by blower 38. This configuration eliminates the need for the pair of check valves 40, 42 and, thus, can reduce the cost of fuel cell system 20. One embodiment uses the radiator fan as the blower 38,38'. All or a portion of the fan air is ducted to the check valve 42, 42' (as shown in FIGS. 1 and 2), or the inlet of the compressor 32, 32' (as shown in FIG. 3). Utilizing the existing radiator fan and motor avoids the cost of an additional blower in the system. An additional option to FIG. 3 includes providing a bypass valve 43 around the blower in case the compressor 32, 32' has trouble pulling air through a restrictive blower 38, 38'.

Compressor 32 is driven by a motor 44 which is supplied with electrical power from fuel cell stack 22. Blower 38, however, is supplied with electrical power from a low voltage power source 46. Power source 46 can take a variety of forms. For example, power source 46 can be a low voltage battery or a low voltage capacitor, such as an ultracap. Power source 46 can be charged with the power output of fuel cell stack 22 during normal operation.

A controller 48 is provided for controlling operation of motor 44 and blower 38 as well as sensing the voltage level of the cells of fuel cell stack 22. Controller 48 is provided power from low voltage power source 46 and later from fuel cell stack 22 when operational. Controller 48 in conjunction with low voltage power source 46 can also be used to control operation of hydrogen supply valve 28 when it is being electrically controlled. It should be understood that the terms "low voltage" and "high voltage" as used herein are relative terms and that "low voltage" refers to a voltage of less than or equal to about 50 volts while "high voltage" refers to a voltage in excess of about 50 volts.

A preferred method of operating fuel cell system 20 provides for starting of the fuel cell system without using any battery-derived high voltage power to drive compressor 32. According to the method of the present invention, hydrogen is supplied to anode inlet 30 by opening valve 28 to allow hydrogen from hydrogen source 24 to flow into the anode flow channels. Valve 28 is either opened manually, via a push button or some other mechanical device operable to open valve 28 without any power or is opened by controller 48 sending a signal to the device, such as a solenoid, operating valve 28. Blower 38 is then commanded by controller 48 to begin operation to supply oxygen to the cathode flow channels and fuel cell stack 22 from oxygen supply 26. Blower 38 is powered by low voltage power source 46. The supply of hydrogen and oxygen enables fuel cell stack 22 to begin producing a voltage output that increases over time as more hydrogen and oxygen are supplied to and consumed by fuel cell stack 22. Controller 48 monitors the voltage output of fuel cell stack 22. As the voltage output of fuel cell stack 22 increases, compressor 32 can be brought online and driven by the voltage output of fuel cell stack 22 to supply additional oxygen to cathode inlet 34 from oxygen source 26.

Specifically, as controller 48 determines that electrical power is being generated by fuel cell stack 22, motor 44 is commanded to apply a load on fuel cell stack 22 that slowly begins to drive compressor 32 in order to provide additional air to the cathode flow channels of fuel cell stack 22. The load tied to fuel cell stack 22 is then gradually increased by increasing a load of motor 44 until the system is producing sufficient net power to operate under normal operating conditions. Preferably, compressor 32 is not operated until the voltage output of fuel cell stack 22 reaches a predetermined value. The predetermined value is chosen based upon the design of fuel cell system 20, the voltage output of fuel cell stack 22 possible with the supply of air to the cathode flow channels via blower 38 when powered by low voltage power source 46, and the number and capability of the DC/DC converters (not shown) that are used to step up the voltage of fuel cell stack 22 to a value sufficient to drive motor 44 and compressor 32. The higher the voltage output of fuel cell stack 22 prior to the initiation of driving motor 44 and compressor 32 can reduce the number of DC/DC converters that are needed to get the voltage output of fuel cell stack 22 up to the high voltage level required to operate motor 44 and compressor 32. That is, the delay of operation of motor 44 and compressor 32 until a higher voltage is produced by fuel cell stack 22 reduces the number of DC/DC converters that are needed to step up the voltage output due to a higher initial voltage output of fuel cell stack 22 prior to commencing operation of motor 44 and compressor 32.

As compressor 32 is operated to supply additional air to the cathode flow channels of fuel cell stack 22, operation of blower 38 can be decreased. That is, as the voltage output of fuel cell stack 22 increases to a quantity sufficient to begin driving motor 44 and compressor 32, operation of blower 38 is decreased. Operation of blower 38 can be decreased over time as the voltage output of fuel cell stack 22 increases, once the voltage output of fuel cell stack 22 has reached a predetermined value, and/or once the voltage output of fuel cell stack 22 is sufficient to support operation of compressor 32 at a level that enables compressor 32 to supply all the air required by fuel cell stack 22 to continue to increase the voltage output up to the normal operational level.

Control of fuel cell system 20 during start-up can be handled in alternative ways. One method would be to use controller 48 to monitor the cell voltages and command compressor motor 44 to load fuel cell stack 22 in a way to keep the cell voltages at reasonable levels. As compressor 32 begins to flow air, as detected by a signal from an air flow sensor or manifold pressure sensor 50, more hydrogen can be commanded via further opening of valve 28 and more compressor load can be applied. A snowballing effect allows the system to ramp up to a positive net power condition. As the system is capable of providing positive net power, controller 48 can switch to a run control mode and take over operation of fuel cell system 20. Controller 48 also can command blower 38 to begin ceasing operation as the voltage output of fuel cell stack 22 is increased and/or depending upon the flow of air, as detected by sensor 50, as the air flowing into the cathode flow channels of fuel cell stack 22 increases. The operation of blower 38 ceases when a predetermined voltage output of fuel cell stack 22 is achieved, system 20 is capable of providing positive net power, and/or compressor 32 is operating at a level sufficient to supply the required quantity of air to the fuel cell stack 22.

Another alternative method would be to characterize the starting behavior of fuel cell stack 22, blower 38 and compressor 32 to a point where the commanded hydrogen flow and commenced operation of blower 38 and compressor 32 can be handled on an open loop basis. In other words, the introduction of hydrogen and the associated supply of air by blower 38 and eventual load applied to compressor motor 44 can be characterized to a time schedule so that during start-up, the introduction of hydrogen supplied to anode inlet 30, control of blower 38 and of compressor motor 44 can be controlled according to a computer implemented (or dedicated circuit controlled) time schedule in order to achieve system start-up. In this scenario, the cell voltage monitoring would not be needed thereby simplifying the electronics.

Thus, with this mechanization and the method according to the principles of the present invention, at start-up, all that is needed is a low voltage power source 46 to operate controller 48, blower 38 and hydrogen supply valve 28 (when electrically controlled). Fuel cell stack 22 is started up by using a low voltage blower 38 instead of high voltage compressor 32 to supply air to the cathode side. This enables a much smaller power source to be utilized in fuel cell system 20 and reduces the number and costs of DC/DC converters used to step up low voltage to high voltage to power compressor 32.

In an alternate embodiment, as shown in FIG. 2, the present invention provides for start-up of a fuel cell system 20' using the power produced by fuel cell stack 22'. Fuel cell system 20' is substantially the same as fuel cell system 20 shown in FIG. 1. The difference being that low voltage power source 46 is not present in fuel cell system 20' and controller 48', hydrogen supply valve 28' (when electrically controlled), and blower 38', as a result, are powered by fuel cell stack 22' as controlled by controller 48'.

The present invention provides a method for starting fuel cell system 20' using only power derived from fuel cell stack 22'. A first way in which this is accomplished is by operating fuel cell stack 22' in a manner that provides for oxygen or air to remain in the cathode flow channel of fuel cell stack 22' upon shutting down operation of fuel cell stack 22'. In other words, fuel cell stack 22', when being shut down, is operated in a manner to ensure that oxygen is present in the cathode flow channels of fuel cell stack 22' at the time it is desired to start-up fuel cell stack 22'. Fuel cell stack 22' can be operated in a number of different manners during a shut down procedure to ensure that oxygen is present in the cathode flow channels of fuel cell stack 22' when it is desired to start-up fuel cell stack 22'. One way to accomplish this is by purging the anode and cathode flow channels of fuel cell stack 22' with oxygen or air during the shut-down procedure. The purging operation will purge a majority or all of the hydrogen from the anode flow channels along with purging water accumulated in the flow channels of fuel cell stack 22'. By purging fuel cell stack 22' with air prior to shut down, air or oxygen will be present in both the cathode flow channels and anode flow channels of fuel cell stack 22' when it is desired to start-up fuel cell stack 22'.

Another way to provide for oxygen or air to be present in the cathode flow channels of fuel cell stack 22' at start-up is to provide the cathode flow channels of fuel cell stack 22' with an excessive amount of oxygen or air prior to shutting down fuel cell stack 22'. In other words, oxygen or air is supplied to the cathode flow channels at a concentration or amount that is much greater than the stoichiometric amount required based upon the quantity of hydrogen in the anode flow channels of fuel cell stack 22'. The result is that when fuel cell stack 22' is shut down, the oxygen in the cathode flow channels and the hydrogen in the anode flow channels will continue to be consumed and fuel cell stack 22' will produce an open circuit voltage. The open circuit voltage will decrease over time as the hydrogen and oxygen in the respective anode and cathode flow channels of fuel cell stack 22' are consumed. By providing an excessive amount of oxygen or air to the cathode flow channels, when all the hydrogen in the anode flow channels of fuel cell stack 22' is consumed, there will be remaining oxygen or air in the cathode flow channels that can be used during the start-up of fuel cell stack 22'.

Another way to provide oxygen on the cathode side of fuel cell stack 22' prior to the start-up operation is to preload oxygen in the cathode flow channels. This can be accomplished by shutting down fuel cell stack 22' and monitoring the open circuit voltage output of fuel cell stack 22' as the remaining oxygen and hydrogen in the respective cathode and anode flow channels is consumed. When the stack voltage drops to a predetermined level, controller 48' commands blower 38' to supply oxygen to the cathode inlet 34' of fuel cell stack 22' to preload or provide a boost of oxygen or air to the cathode flow channels. The quantity of oxygen supplied to the cathode flow channels during the preloading process should be sufficient to have a desired amount of oxygen remaining after the remaining hydrogen in the anode flow channels of fuel cell stack 22' is consumed. Thus, there are at least three different ways in which fuel cell stack 22' can be shut down to ensure that there is oxygen in the cathode flow channels for a subsequent start-up procedure of fuel cell stack 22'.

According to the methods of the present invention, when it is desired to start-up fuel cell stack 22', hydrogen is supplied to anode inlet 30' by opening valve 28' which allows hydrogen from source 24' to flow into the anode flow channels. The hydrogen in the anode flow channels and the existing air or oxygen in the cathode flow channels enables electrical power to be generated by fuel cell stack 22'.

As controller 48' determines that electrical power is being generated by fuel cell stack 22', controller 48' commands blower 38' to draw power from fuel cell stack 22' and begin to supply additional oxygen from oxygen source 26' to cathode inlet 34' of fuel cell stack 22'. Controller 48' also takes over control of hydrogen supply valve 28'. The voltage of fuel cell stack 22' increases as a result of the oxygen and hydrogen present in the respective cathode and anode flow channels. Controller 48' can monitor the quantity of air being supplied to cathode inlet 34' with sensor 50' and adjust the quantity of oxygen or air being supplied to inlet 34' accordingly.

As the voltage produced by fuel cell stack 22' increases, controller 48' commands motor 44' to apply a load on fuel cell stack 22' that slowly begins to drive compressor 32' which provides additional air or oxygen to the cathode flow channels of fuel cell stack 22'. The load tied to fuel cell stack 22' is then gradually increased by increasing the load of motor 44' until the system is producing sufficient net power to operate under normal operating conditions. The operation of blower 38' is phased out as the production of electrical power by fuel cell stack 22' is sufficient to drive compressor 32' at a level that supplies the needed oxygen to the cathode flow channels of fuel cell stack 22' to continue to increase the production of fuel cell stack 22' up to the operational level.

The controlling of the blower 38', compressor 32' and valve 28' is substantially the same as that discussed above with reference to fuel cell system 20, as shown in FIG. 1. Accordingly, controller 48' can be used to monitor the voltage produced by fuel cell stack 22' and to control the operation of blower 38', compressor 32' and/or valve 28'. Fuel cell system 20' can also be operated on an open-loop control basis without the need for controller 48' to monitor the voltage output of fuel cell stack 22'. Thus, fuel cell system 20' can be started up without the use of a low voltage power source and through the use of low voltage blower 38' which reduces the cost and quantity of DC/DC converters needed to initiate the operation of fuel cell stack 22'.

The present invention also provides an alternate method of operation of a fuel cell system without a low voltage power source. Specifically, the present invention provides an alternate method for operating fuel cell system 20' that maintains fuel cell stack 22' in a stand-by mode whenever normal operation of fuel cell stack 22' is not needed. In this method, fuel cell stack 22' is operated as a battery to provide low voltage power to blower 38' to enable start-up of fuel cell stack 22'.

According to this method, fuel cell stack 22' is operated in a stand-by mode when normal operation of fuel cell stack 22' is not needed. That is, fuel cell stack 22' is maintained in a stand-by mode so that fuel cell stack 22' has a voltage output that can be utilized during a start-up of fuel cell stack 22' when normal operation of fuel cell stack 22' is desired. The operation of fuel cell stack 22' in a stand-by mode begins with the fuel cell stack 22' being shut down from a previously occurring normal operating state. The voltage of fuel cell stack 22' is allowed to decrease as the remaining oxygen and hydrogen in the respective cathode and anode flow channels of fuel cell stack 22' is consumed. The voltage output of fuel cell stack 22' is monitored by controller 48' and is maintained above a predetermined minimum value. That is, the voltage of fuel cell stack 22' is allowed to decrease to a preset level before being operated to produce additional voltage so that the voltage output of fuel cell stack 22' is maintained above the predetermined minimum value.

To maintain the voltage above the predetermined minimum value, controller 48' monitors the voltage output of fuel cell stack 22' and, as appropriate, commands hydrogen valve 28' to introduce additional hydrogen to anode inlet 30' of fuel cell stack 22' and commands blower 38' to supply additional oxygen from oxygen source 26' to cathode inlet 34' of fuel cell stack 22'. By selectively adding additional hydrogen and oxygen to the respective anode and cathode sides of fuel cell stack 22', the voltage output of fuel cell stack 22' can be controlled and maintained above the predetermined minimum value. The addition of additional oxygen and/or hydrogen causes the voltage output of fuel cell stack 22' to increase or maintain a predetermined minimum value as the oxygen and hydrogen are consumed. The power produced by fuel cell stack 22' can then be allowed to decay or decrease again until reaching the level at which controller 48' again instructs hydrogen and oxygen to be supplied to the respective anode and cathode sides of fuel cell stack 22' via valve 28' and blower 38'. This process continues until normal operation of fuel cell stack 22' is needed and a start-up operation is initiated. Alternatively, controller 48' can command hydrogen valve 28' and blower 38' to supply a steady light stream of hydrogen and oxygen to the respective anode and cathode sides of fuel cell stack 22' to maintain the voltage output of fuel cell stack 22' at or above a predetermined minimum valve. In either of these manners, the voltage output of fuel cell stack 22' is maintained at or above a predetermined minimum value so that there is sufficient power produced by fuel cell stack 22' to operate controller 48', valve 28' and blower 38'.

When normal operation of fuel cell stack 22' is needed, the operation of fuel cell stack 22' switches from the stand-by mode to a start-up mode. During the start-up mode, fuel cell stack 22' acts as a low voltage power source to start-up fuel cell system 20'. The availability of a low voltage power source enables fuel cell system 20' to be started up using one of the methods described above in relation to fuel cell system 20' and/or in relation to fuel cell system 20 wherein the voltage output of fuel cell stack 22' is used in lieu of that of low voltage power source 46.

Accordingly, the present invention provides for start-up of a fuel cell system utilizing a low voltage blower instead of a high voltage compressor. The use of a low voltage blower eliminates the need for providing DC/DC converters to convert a low voltage power into a high voltage power to drive a high voltage compressor. The low voltage blower also reduces the size of the low voltage power source required to start-up the fuel cell system. The present invention also discloses a manner in which the fuel cell stack can be utilized as the low voltage power source so that a fuel cell system can be started up and operated without the presence of any power source other than that produced by the fuel cell stack.

It should be appreciated that changes and alterations to fuel cell systems 20, 20' can be employed without departing from the spirit and scope of the present invention. For example, check valves 40, 42 can be replaced with computer controlled solenoid valves. Check valves 40, 42 could also be replaced with a three-way valve that phases air flow from the blower and the compressor. Thus, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of fuel cell start-up for a fuel cell system having a hydrogen source connected to an anode inlet of a fuel cell stack, an oxygen source connected to a cathode inlet of the fuel cell stack, and a low voltage power source, the cathode inlet being connected to a high voltage compressor and to a low voltage blower, the method comprising:
   introducing hydrogen to the anode inlet of the fuel cell stack;
   operating the low voltage blower with the low voltage power source for supplying oxygen to the cathode inlet of the fuel cell stack;
   producing a voltage output with the fuel cell stack using oxygen supplied by the blower; and
   supplementing the quantity of oxygen supplied to the cathode inlet of the fuel cell stack when said voltage output is sufficient to begin driving the high voltage compressor by simultaneously operating the high voltage compressor with said voltage output of the fuel cell stack and the low voltage blower with the low voltage power source.

2. The method of claim 1, wherein supplementing the quantity of oxygen supplied includes:
   applying an electrical load to the fuel cell stack via the compressor for supplying additional oxygen to the cathode inlet with the compressor; and
   increasing the electrical load applied to the fuel cell stack via the compressor over time to supply additional oxygen to the cathode inlet with the compressor.

3. The method of claim 2, further comprising monitoring the voltage output of the fuel cell stack and wherein applying an electrical load to the fuel cell stack via the compressor is initiated after the voltage output of the fuel cell stack has reached a predetermined value.

4. The method of claim 2, wherein increasing the electrical load applied to the fuel cell stack via the compressor over time is performed gradually.

5. The method of claim 2, wherein increasing the electrical load applied to the fuel cell stack is performed by an electronic controller that monitors cell voltages of the fuel cell stack and commands a compressor motor to load the fuel cell stack and to increase the load on the fuel cell stack as the cell voltages of the fuel cell stack increase.

6. The method of claim 2, wherein increasing the electrical applied load to the fuel cell stack is performed until the fuel cell stack produces enough electrical power to operate at a positive net power.

7. The method of claim 1, wherein introducing hydrogen to the anode inlet includes opening a valve to release hydrogen flow to the anode inlet.

8. The method of claim 7, wherein said valve is opened by an electronic solenoid.

9. The method of claim 1, further comprising decreasing the operation of the blower over time as the voltage output of the fuel cell stack increases.

10. The method of claim 1, further comprising ceasing operation of the blower when the voltage output of the fuel cell stack has reached a predetermined value.

11. The method of claim 1, further comprising ceasing operation of the blower when the voltage output of the fuel cell stack is sufficient to support operation of the compressor.

12. A method of fuel cell start-up for a fuel cell system having a hydrogen source connected to an anode inlet of a fuel cell stack and an oxygen source connected to a cathode inlet of the fuel cell stack, the cathode inlet being connected to a high voltage compressor and to a low voltage blower, a cathode side of the fuel cell stack containing oxygen prior to start-up, the method comprising:
   introducing hydrogen to the anode inlet of the fuel cell stack for producing a voltage with the fuel cell stack;
   producing a voltage with the fuel cell stack utilizing the existing oxygen contained in the cathode side of the fuel cell stack and the hydrogen introduced to the anode inlet;
   operating the low voltage blower with the voltage produced by the fuel cell stack thereby supplying additional oxygen to the cathode inlet of the fuel cell stack via the blower;
   increasing the voltage produced by the fuel cell stack over time; and
   decreasing the operation of the blower over time as the voltage output of the fuel cell stack increases.

13. A method of fuel cell start-up for a fuel cell system having a hydrogen source connected to an anode inlet of a fuel cell stack and an oxygen source connected to a cathode inlet of the fuel cell stack, the cathode inlet being connected to a high voltage compressor and to a low voltage blower, a cathode side of the fuel cell stack containing oxygen prior to start-up, the method comprising:
   introducing hydrogen to the anode inlet of the fuel cell stack for producing a voltage with the fuel cell stack;
   producing a voltage with the fuel cell stack utilizing the existing oxygen contained in the cathode side of the fuel cell stack and the hydrogen introduced to the anode inlet;
   operating the low voltage blower with the voltage produced by the fuel cell stack thereby supplying additional oxygen to the cathode inlet of the fuel cell stack via the blower;
   increasing the voltage produced by the fuel cell stack over time; and
   ceasing operation of the blower when the voltage output of the fuel cell stack has reached a predetermined value.

14. A method of fuel cell start-up for a fuel cell system having a hydrogen source connected to an anode inlet of a fuel cell stack and an oxygen source connected to a cathode inlet of the fuel cell stack, the cathode inlet being connected to a high voltage compressor and to a low voltage blower, a cathode side of the fuel cell stack containing oxygen prior to start-up, the method comprising:

introducing hydrogen to the anode inlet of the fuel cell stack for producing a voltage with the fuel cell stack;

producing a voltage with the fuel cell stack utilizing the existing oxygen contained in the cathode side of the fuel cell stack and the hydrogen introduced to the anode inlet;

operating the low voltage blower with the voltage produced by the fuel cell stack thereby supplying additional oxygen to the cathode inlet of the fuel cell stack via the blower;

increasing the voltage produced by the fuel cell stack over time; and ceasing operation of the blower when the voltage output of the fuel cell stack is sufficient to support operation of the compressor.

15. A method of fuel cell operation for a fuel cell system having a hydrogen source connected to an anode inlet of a fuel cell stack and an oxygen source connected to a cathode inlet of the fuel cell stack, the cathode inlet being connected to a high voltage compressor and to a low voltage blower, the method comprising:

operating the fuel cell stack in a stand-by mode when normal operation of the fuel cell stack is not needed, operating the fuel cell stack in the stand-by mode including:

monitoring a voltage of the fuel cell stack;

maintaining the voltage of the fuel cell stack above a predetermined minimum value by:

selectively introducing hydrogen to the anode inlet of the fuel cell stack;

selectively operating the low voltage blower with the voltage of the fuel cell stack to supply oxygen to the cathode inlet of the fuel cell stack via the low voltage blower; and operating the fuel cell stack in a normal mode when normal operation of the fuel cell stack is needed, operating of the fuel cell stack in the normal mode including supplying oxygen to the cathode inlet of the fuel cell stack via The high voltage compressor.

16. The method of claim 15, further comprising starting-up the fuel cell stack from the stand-by mode when normal operation of the fuel cell stack is needed, starting-up the fuel cell stack from the stand-by mode including:

introducing hydrogen to the anode inlet of the fuel cell stack;

operating the blower with the voltage of the fuel cell stack;

supplying oxygen to the cathode inlet of the fuel cell stack via the blower;

increasing the voltage produced by the fuel cell stack over time using oxygen supplied by the blower; and supplementing the quantity of oxygen supplied to the cathode inlet of the fuel cell stack when said voltage output is sufficient to begin driving the high voltage compressor by simultaneously operating the high voltage compressor and the low voltage blower with said voltage output of the fuel cell stack.

17. The method of claim 16, wherein operating the high voltage compressor further includes:

applying an electrical load to the fuel cell stack via the compressor for supplying additional oxygen to the cathode inlet; and increasing the electrical load applied to the fuel cell stack via the compressor over time to supply additional oxygen to the cathode inlet.

18. The method of claim 17, wherein starting-up the fuel cell stack further includes monitoring the voltage output of the fuel cell stack and wherein applying an electrical load to the fuel cell stack via the compressor is initiated after the voltage output of the fuel cell stack has reached a predetermined value.

19. The method of claim 17, wherein increasing the electrical load applied to the fuel cell stack via the compressor over time is performed gradually.

20. The method of claim 17, wherein increasing the electrical load applied to the fuel cell stack is performed by an electronic controller which monitors cell voltages of the fuel cell stack and commands a compressor motor to load the fuel cell stack and to increase the load on the fuel cell stack as the cell voltages of the fuel cell stack increase.

21. The method of claim 17, wherein increasing the electrical load applied to the fuel cell stack is performed until the fuel cell stack produces enough electrical power to operate at a positive net power.

22. The method of claim 16, wherein introducing hydrogen to the anode inlet includes opening a valve to release hydrogen flow to the anode inlet.

23. The method of claim 22, wherein said valve is opened manually.

24. The method of claim 22, wherein said valve is opened by an electronic solenoid.

25. The method of claim 16, wherein starting-up the fuel cell stack further includes decreasing the operation of the blower over time as the voltage output of the fuel cell stack increases.

26. The method of claim 16, wherein starting-up the fuel cell stack further includes ceasing operation of the blower when the voltage output of the fuel cell stack has reached a predetermined value.

27. The method of claim 16, wherein starting-up the fuel cell stack further includes ceasing operation of the blower when the voltage output of the fuel cell stack is sufficient to support operation of the compressor.

28. The method of claim 15, wherein operating the fuel cell stack in a stand-by mode further includes allowing the voltage of the fuel cell stack to decrease to a predetermined value before introducing hydrogen and operating the blower.

29. The method of claim 28, wherein during operation of the fuel cell stack in the stand-by mode, allowing the voltage of the fuel cell stack to decrease to the predetermined value is done repetitively.

30. The method of claim 25, wherein during operation of the fuel cell stack in the stand-by mode hydrogen is not introduced and the blower is not operated while the voltage of the fuel cell stack is allowed to decrease to the predetermined value.

31. The method of claim 15, wherein operating the fuel cell stack in the stand-by mode includes introducing a steady light stream of hydrogen to the anode inlet of the fuel cell stack and supplying a steady light stream of oxygen to the cathode inlet of the fuel cell stack via the blower.

32. The method of claim 15, wherein maintaining the voltage of the fuel cell stack is performed by an electronic controller that monitors cell voltages of the fuel cell stack and that commands the selective introduction of hydrogen and the selective operation of the blower.

33. A method of fuel cell start-up for a fuel cell system having a hydrogen source connected to an anode inlet of a fuel cell stack and an oxygen source connected to a cathode inlet of the fuel cell stack, the cathode inlet being connected to a high voltage compressor and to a low voltage blower, a cathode side of the fuel cell stack containing oxygen prior to start-up, the method comprising:

introducing hydrogen to the anode inlet of the fuel cell stack for producing a voltage with the fuel cell stack;

producing a voltage with the fuel cell stack utilizing the existing oxygen contained in the cathode side of the fuel cell stack and the hydrogen introduced to the anode inlet;

operating the low voltage blower with the voltage produced by the fuel cell stack thereby supplying additional oxygen to the cathode inlet of the fuel cell stack via the blower;

increasing the voltage produced by the fuel cell stack over time: and supplementing the quantity of oxygen supplied to the cathode inlet of the fuel cell stack when said voltage produced by the fuel cell stack is sufficient to begin driving the high voltage compressor by simultaneously operating the high voltage compressor and the low voltage blower with the voltage produced by the fuel cell stack.

34. The method of claim 33, wherein operating the high voltage compressor includes:

applying an electrical load to the fuel cell stack via the compressor for supplying additional oxygen to the cathode inlet with the compressor; and increasing the electrical load applied to the fuel cell stack via the compressor over time to supply additional oxygen to the cathode inlet with the compressor.

35. The method of claim 34, further comprising monitoring the voltage output of the fuel cell stack and wherein applying an electrical load to the fuel cell stack via the compressor is initiated after the voltage output of the fuel cell stack has reached a predetermined value.

36. The method of claim 34, wherein increasing the electrical load applied to the fuel cell stack via the compressor over time is performed gradually.

37. The method of claim 34, wherein increasing the electrical load applied to the fuel cell stack is performed by an electronic controller that monitors cell voltages of the fuel cell stack and commands a compressor motor to load the fuel cell stack and to increase the load on the fuel cell stack as the cell voltages of the fuel cell stack increase.

38. The method of claim 34, wherein increasing the electrical load applied to the fuel cell stack is performed until the fuel cell stack produces enough electrical power to operate at a positive net power.

39. The method of claim 12, wherein introducing hydrogen to the anode inlet includes opening a valve to release hydrogen flow to the anode inlet.

40. The method of claim 39, wherein said valve is opened manually.

41. The method of claim 39, wherein said valve is opened by an electronic solenoid.

42. The method of claim 12, further comprising supplementing the quantity of oxygen supplied to the cathode inlet of the fuel cell stack when said voltage produced by the fuel cell stack is sufficient to begin driving the high voltage compressor by simultaneously operating the high voltage compressor and the low voltage blower with the voltage produced by the fuel cell stack.

43. The method of claim 13, further comprising decreasing the operation of the blower over time as the voltage output of the fuel cell stack increases.

44. The method of claim 13, further comprising supplementing the quantity of oxygen supplied to the cathode inlet of the fuel cell stack when said voltage produced by the fuel cell stack is sufficient to begin driving the high voltage compressor by simultaneously operating the high voltage compressor and the low voltage blower with the voltage produced by the fuel cell stack.

45. The method of claim 14, further comprising decreasing the operation of the blower overtime as the voltage output of the fuel cell stack increases.

46. The method of claim 14, further comprising supplementing the quantity of oxygen supplied to the cathode inlet of the fuel cell stack when said voltage produced by the fuel cell stack is sufficient to begin driving the high voltage compressor by simultaneously operating the high voltage compressor and the low voltage blower with the voltage produced by the fuel cell stack.

* * * * *